United States Patent [19]

Orpana

[11] 4,141,600
[45] Feb. 27, 1979

[54] TRACTION ELEMENT FOR A VEHICLE TRACK

[75] Inventor: Robert J. Orpana, Ste. Foy, Canada

[73] Assignee: Panatrac Manufacturing Corporation Limited, Thornhill, Canada

[21] Appl. No.: 743,884

[22] Filed: Nov. 22, 1976

Related U.S. Application Data

[63] Continuation-in-part of Ser. No. 594,140, Jul. 7, 1975, abandoned.

[51] Int. Cl.² ............................................. B62D 55/20
[52] U.S. Cl. ..................................... 305/36; 305/38; 305/42
[58] Field of Search ................... 305/35 R, 36–38, 305/42, 53, 39, 56–59; 74/229, 243 NC, 245 R, 245 P, 247, 250 S; 180/9.62

[56] References Cited

U.S. PATENT DOCUMENTS

| | | | |
|---|---|---|---|
| 1,574,042 | 2/1926 | Bager et al. | 305/57 X |
| 2,012,958 | 9/1935 | Colby et al. | 305/59 X |
| 3,539,230 | 11/1970 | Comellas | 305/56 X |
| 3,578,823 | 5/1971 | Clymer | 305/42 |
| 3,649,085 | 3/1972 | Comellas | 305/38 |

FOREIGN PATENT DOCUMENTS 588429  6/1940  United Kingdom ..................... 305/42

Primary Examiner—John P. Shannon
Attorney, Agent, or Firm—Rogers, Bereskin & Parr

[57] ABSTRACT

A modular track for a tracked vehicle is described. The track includes a plurality of traction elements, each made of a resilient material. Each element is shaped to define tapered ends and a lower ground-engaging surface having radiused surface portions on which the element can pivot in use.

5 Claims, 15 Drawing Figures

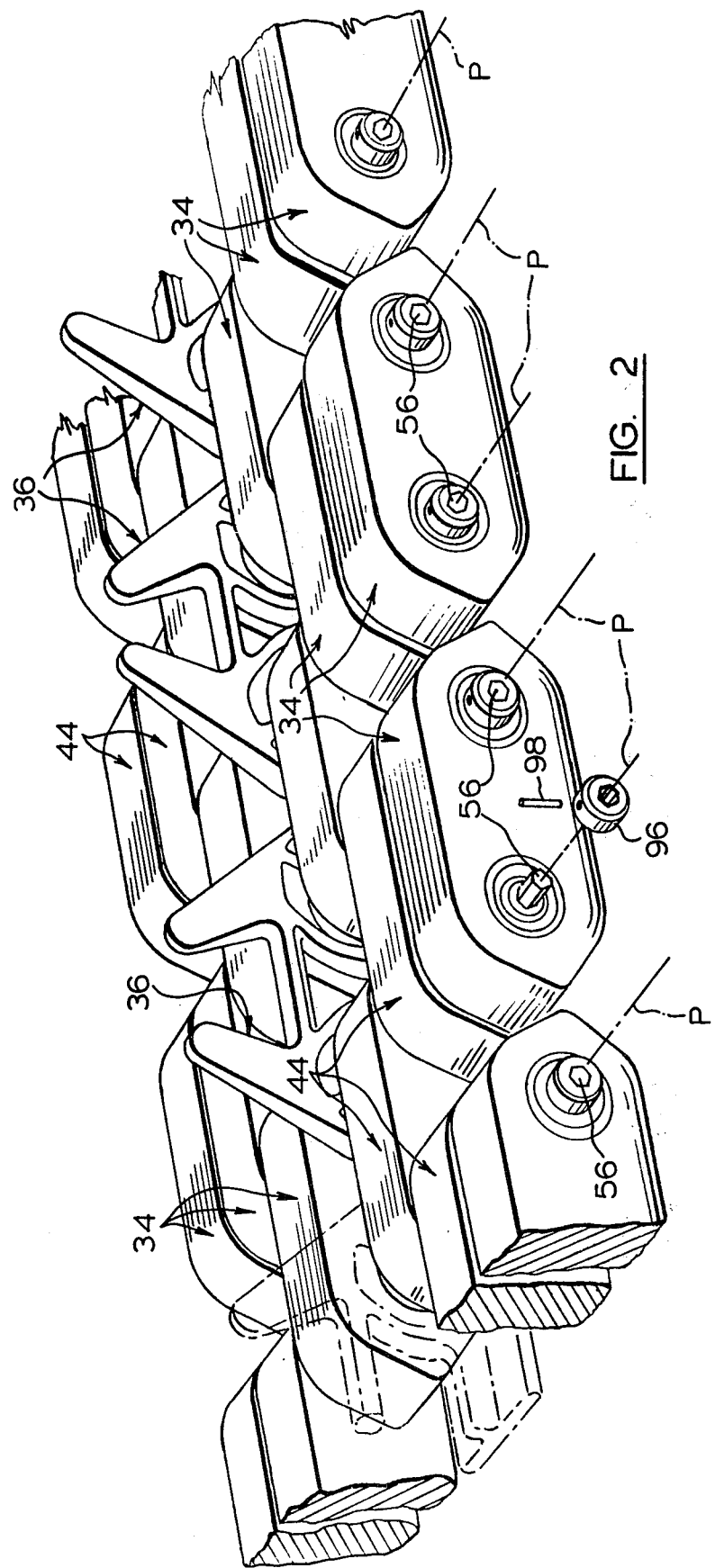

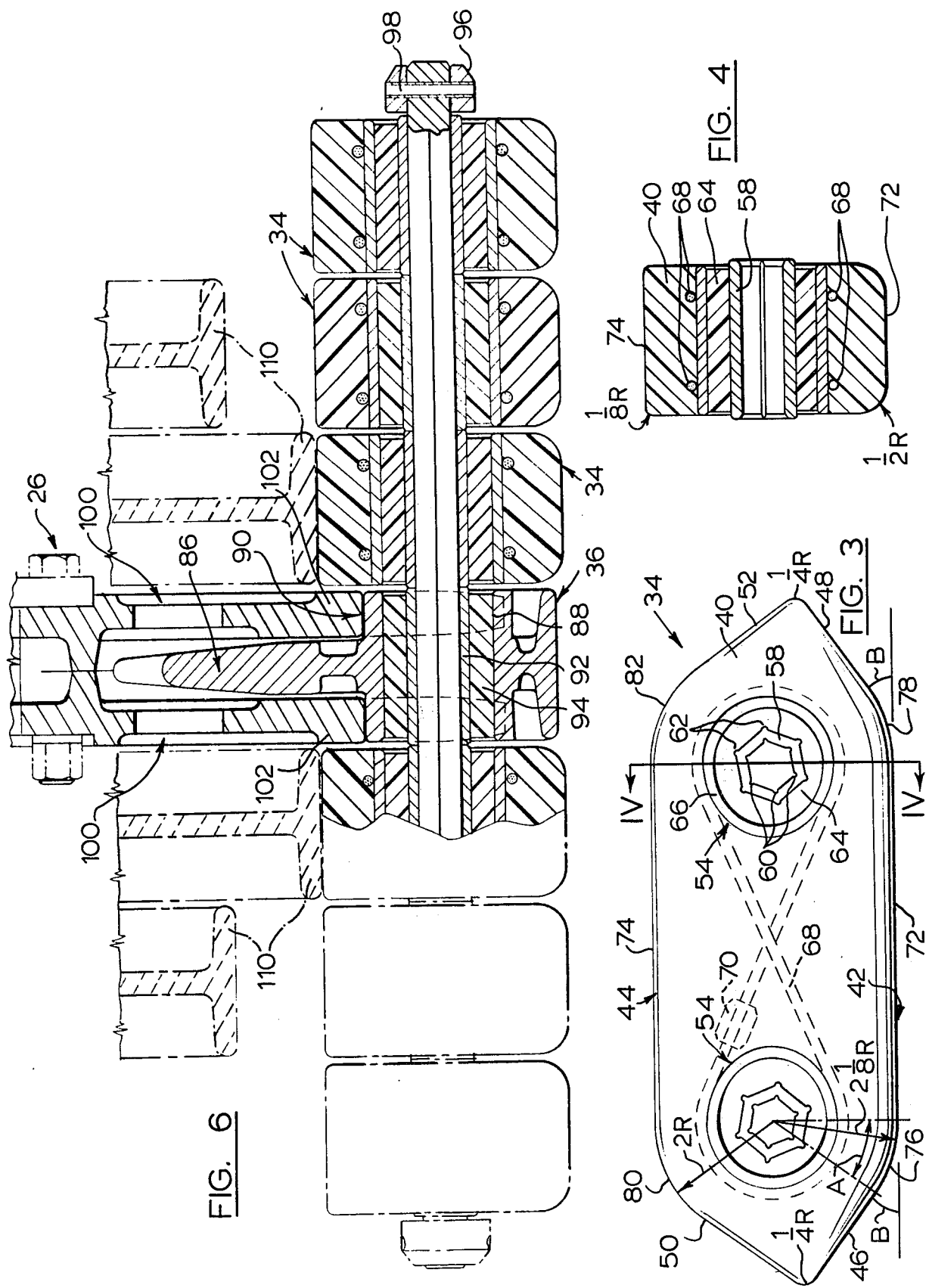

TRACTION ELEMENT FOR A VEHICLE TRACK

This is a continuation-in-part of application Ser. No. 594,140 filed July 7, 1975, now abandoned.

This invention relates generally to endless tracks for tracked vehicles. In particular, the invention is concerned with traction elements for tracks of the type which are referred to as "modular" tracks (also called "segmented" tracks).

A conventional modular track is normally made up of a plurality of traction elements and a plurality of wheel guiding elements pivotally coupled together. Tracks of this type have certain advantages compared with a conventional "grouser" type track comprising an endless belt provided with projecting formations (grousers) which engage the ground. The modular type of track produces compacted mounds of solid or "positive footprints" in the ground over which it travels. As a result, traction is improved compared with a grouser-type track and damage to the ground surface is reduced.

However, conventional modular tracks do have serious disadvantages. One problem is that the imprint of the track changes from a gentle footprint when used on ground surfaces of low resistance such as soft, fragile soil or snow, into an agressive footprint on surfaces of higher resistance. This aggressive action of the track is sufficient to cause soil density breakdown with consequent loss of traction and increased soil damaged. Structural damage to the track itself may also result.

U.S. Pat No. 3,649,085 shows an example of a prior art modular track.

An object of the present invention is to provide an improved traction element for use in a modular or segmented track for a tracked vehicle.

According to the invention, the element includes a resilient body having a lower ground-contacting surface, and an upper road wheel-contacting surface. The said surfaces are generally flat in transverse cross-section and include respective end portions which are inclined towards one another to define tapered ends of the body. Means are provided adjacent each end of the body for coupling the element with other elements in a track. The coupling means define parallel axes extending transversely of the body about which the elements can move angularly in use. Tensile reinforcing means extend between the coupling means inside the resilient body. The upper and lower surfaces of the body include respective central portions extending parallel to one another. The lower surface includes radiused surface portions located at each end of said central portion such that said end portions merge smoothly into the central portion. Each radiused portion defines, in cross-section, an arc centered on the adjacent one of said axes, whereby the traction element can pivot on the relevant one of said radiused surface portions when the element moves angularly about the associated axis in use.

The invention will be better understood by reference to the accompanying drawings which illustrate various embodiments of the invention by way of example, and in which:

FIG. 2 is a perspective view of a section of the track shown in FIG. 1;

FIG. 3 is a side view of one of the traction elements of the track in FIG. 2;

FIG. 4 is a sectional view on line IV—IV of FIG. 3;

FIG. 6 is a partial transverse section through the track at the position of a drive sprocket;

FIG. 10 shows the conventional track;

Figure 1:
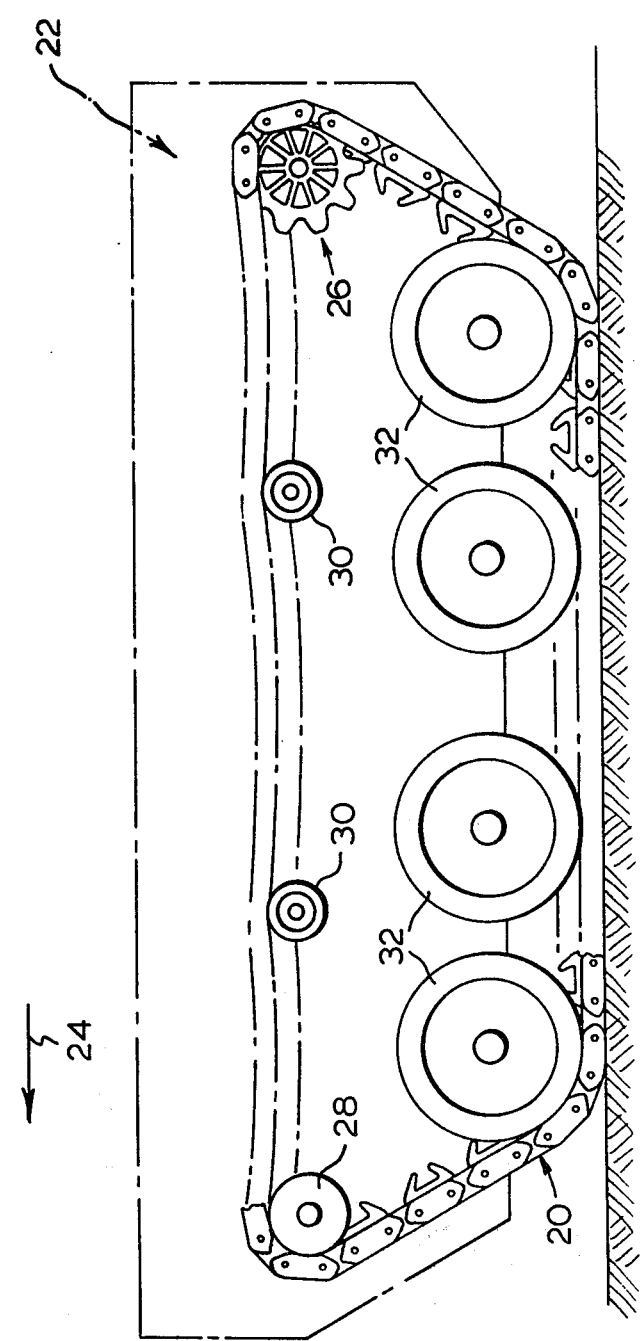
FIG. 1 is a diagrammatic illustration of a tracked vehicle fitted with an endless modular track including traction elements according to the invention.

Referring first to FIG. 1, the track is generally indicated at 20 and is fitted to a conventional tracked vehicle 22. The vehicle itself forms no part of the present invention and is therefore illustrated in ghost outline only. The direction of forward motion of the vehicle is indicated by arrow 24. The vehicle is fitted with a drive sprocket 26 which drivably engages the track 20 and which is located adjacent the rear end of the vehicle. Adjacent the front end of the vehicle, the track passes around an idler wheel 28. The upper run of the track between sprocket 26 and wheel 28 is supported by idlers 30. Four road wheels 32 run on the upper surface of the lower run of the track.

It will of course be appreciated that FIG. 1 shows one side of the vehicle only and that a second, similar track arrangement is provided at the opposite side of the vehicle.

Referring now more particularly to FIG. 2, the track is made up of a plurality of track elements of two types:

(a) traction elements denoted 34, and (b) guiding elements denoted 36. The elements are modular in the sense that each element occupies a similar area of the track. The elements are coupled together by coupling means (to be described) which define pivot axes P extending transversely of the track. Both the traction elements and the guiding elements contact the ground when the track is in use. The traction elements present upper surfaces which are contacted by the road wheels 32 of the vehicle. The guiding elements serve to locate the track laterally in use as will be described.

FIGS. 3 and 4 show one of the traction elements separate from the track. The element includes a body 40 of a resilient elastomeric material. The body has a lower ground-contacting surface 42 and an upper road wheel-contacting surface 44. As can be seen from FIG. 4, the surfaces 42 and 44 are generally flat in transverse cross-section. The surfaces 42 and 44 include respective end portions 46, 48 and 50, 52 which are inclined towards one another to define tapered ends of the body 40.

Traction element 34 is also provided adjacent each end with an assembly 54 for coupling the element with other elements in the track. Each assembly 54 is intended to receive one of a series of hexagonal shafts 56 (see FIG. 2) which couple the elements of the track. The assemblies 54 each include a hexagonal inner sleeve 58 which is made of hardened steel and which is shaped to receive one of the hexagonal shafts 56. As can be seen, the inner surface of sleeve 58 is formed with longitudinal recesses 60 at the corners of the hexagon defined by the sleeve. These recesses make for easier fitting of a shaft into the sleeve in that the recesses accommodate any manufacturing imperfections at the corners of the shaft. The corners of the hexagonal outer surface of sleeve 58 are formed with small protusions 62 complimentary to the recesses 60. Each sleeve 58 is bonded inside a bush 64 which is also of an elastomeric material and which is of elliptical shape in cross-section as can be seen from FIG. 3. In fact, bush 64 is moulded onto sleeve 58. Bush 64 is an interference fit and is secured by adhesive inside an elliptical outer sleeve 66 which is moulded into the elastomeric body 40 of the traction element.

The two coupling assemblies 54 of the traction element are coupled by tensile reinforcing means in the form of two metal cables 68, only one of which is visible in FIG. 3. Both cables are however visible in FIG. 4 and it will be noted that they are spaced transversely of the element. Each cable is looped around both of the sleeves 66 of the two coupling assemblies in a crossed configuration and the outer ends of the cable are joined by a sleeve 70. It will be realised that cables 68 affect only the tensile capacity of the traction element. The cable have minimal effect on the bending, compressive and torsional resistance of the element and make for a traction element having yielding or "forgiving" characteristics.

The lower ground-contacting surface 42 and the upper road wheel-contacting surface 44 of the element are specially profiled as will now be described. The surfaces include respective central portions 72, 74 which extend parallel to one another. When the element is disposed horizontally as shown in FIG. 3, the central portion 72 of its lower surface 42 will rest horizontally on the ground and the central portion 44 of its upper surface 74 will for a horizontal part of the overall road wheel-contacting area of the track. The lower ground contacting surface 42 also includes radiused surface portions 76, 78 located at respectively opposite ends of the central portion 72 such that the end portions 46, 48 of surface 42 merge smoothly into the central portion 72. Each radiused portion defines, in cross-section, an arc centred on the adjacent one of the axes P defined by the coupling assemblies 54 of the element. These radiused surface portions 76, 78 in effect provide pivot surfaces on which the traction element can rock when the element moves angularly about the adjacent axis P. As will be explained in more detail later, the traction elements 34 having a rocking "heel and toe" type of pivotal action in use producing "positive footprint" soil remoulding pattern. It is these radiused surfaces 76, 78 which allow the element to perform in this way.

The upper surface 44 also includes radiused surface portions generally indicated at 80 and 82 which co-operate with corresponding surfaces on adjacent elements in a track as the elements move angularly with respect to one another in use to maintain a relatively smooth upper track surface.

In FIG. 3, the extent of each of said radiused surface portions is indicated by an angle denoted A. In this particular embodiment, the angle is approximately 40°.

The angle of inclination (denoted B) of the end portions 46, 48 of the lower surface 42 is approximately 36°. Considering the radii of the arcs defined by the radiused surface portions 46, 48, 80, 82, if the radius of the arcs of portions 80 and 82 is taken as 2R the radius of the portions 76 and 78 is 2⅛. The radiusing applied to the tapered ends of the element and to the corners of the element (FIG. 4) are also expressed in terms of R in the drawings.

Figure 5:
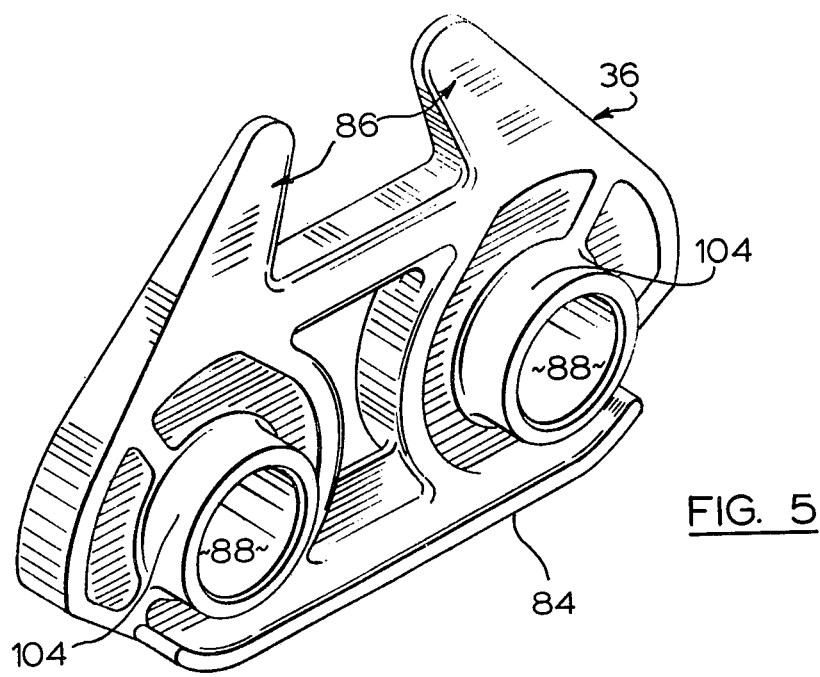
FIG. 5 is a perspective view of one of the track guiding elements of the track of FIG. 2.

FIG. 5 shows one of the guiding elements 36 of the track. The element includes a lower ground-engaging surface 84 and two upwardly projecting and inwardly directed lugs 86. The body of the element also defines two transverse circular openings 88, each of which receives a coupling assembly (not shown) similar to the assembly 54 referred to inconnection with FIGS. 3 and 4. The spacing between the centres of the two openings 88 is equal to the spacing between the two axes P defined by the coupling assemblies 54 of the traction element 34.

The guiding element is more particularly described in the forms the subject of co-pending patent application No. 594,141 of even date herewith entitled "Guiding element for a vehicle track (now U.S. Pat. No. 3,993,367)."

Reference will now be made to FIG. 6 in describing how the elements of the track are assembled. In the particular track configuration under discussion, three rows of traction elements 34 are provided on each side of a single row of guiding elements 36 (FIG. 2) FIG. 6 is a section taken at the position of one of the coupling shafts 56 of the track.

Each of the openings 88 in each guiding element receives a coupling assembly generally indicated at 90 which is similar to the assemblies 54 of FIGS. 3 and 4 but without the outer sleeve. Each assembly 90 includes an inner sleeve 92 of hexagonal shape (similar to the inner sleeves 58 of the assemblies 54) and an elliptical elastomeric bush 94 (similar to the bushes 64) which is moulded onto sleeve 92

The track elements are arranged as shown in FIG. 2 and each of the shafts 56 is inserted through aligned coupling assemblies 54 of relevant traction elements and the appropriate coupling assembly 90 of one of the guiding elements. It will be noted from FIG. 6 that the ends of the inner sleeves 58 and 92 of the coupling assemblies 54 and 90 respectively project slightly and are arranged in abutment with one another so as to space the track element slightly transversely of the track. Each end of each shaft 56 receives a collar 96 attached to the shaft by a hollow cylindrical spring pin 98.

It will be appreciated that the shafts 56 define the pivot axes P referred to in connection with FIG. 2. The shafts allow the track elements to turn with respect to one another about the axes P as the track curves in following its drive path in use. As the elements move about said axes P, torsional forces are applied to the elastomeric bushes 62 (in the case of traction elements) and 94 (in the case of the guiding elements). These forces cause distortion of the bushes allowing the elements to pivot. The fact that the bushes are elliptical in shape inhibits turning of the bushes under the effects of the said torsional forces.

Figure 7:
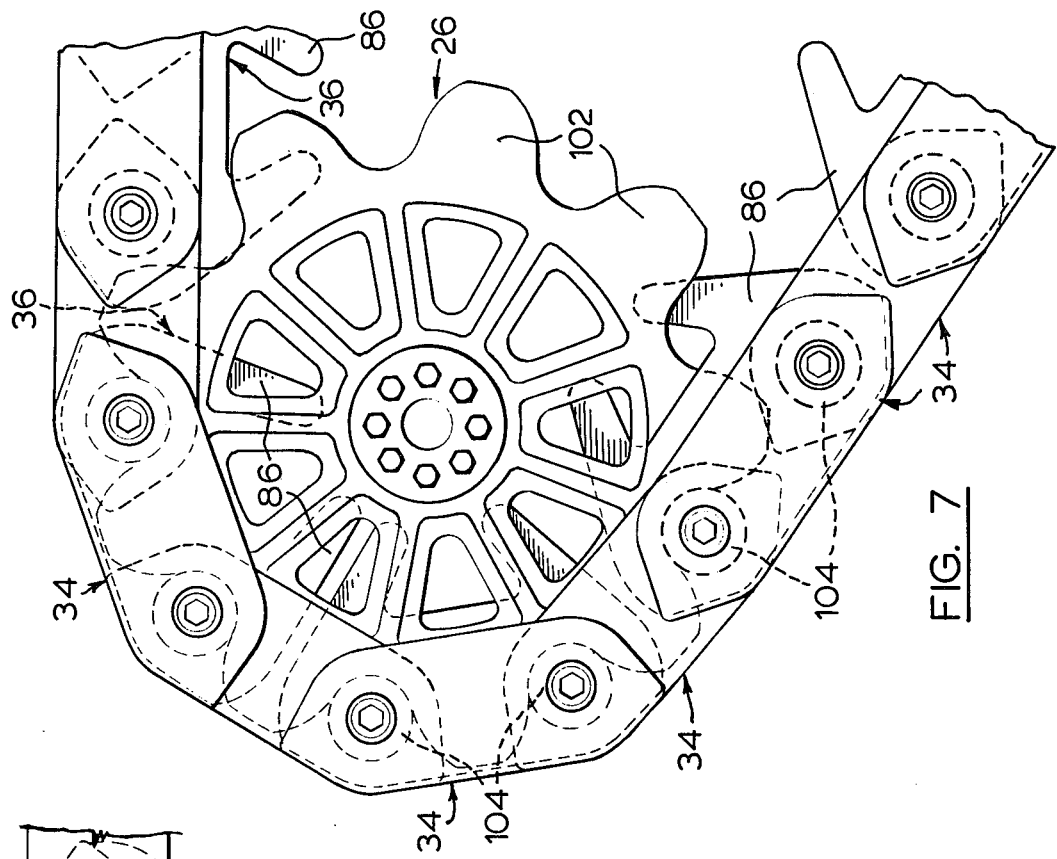
FIG. 7 is a side view of a part of the track at the position of the drive sprocket.

The drive sprocket 26 (FIG. 1) of the track is visible in cross section in FIG. 6 and in enlarged side view in FIG. 7. As can be seen, the sprocket is in effect a double sprocket wheel made up of two similar sprocket halves 100 coupled together. Each half defines a similar series of sprocket teeth 102 of basically conventional profile. The teeth of the respective sprocket halves are spaced at a distance slightly greater than the width of the guiding elements 36 so that the lugs 86 of the elements are received between the sprocket halves. As the track is driven in use, the lugs 86 of successive guiding elements pass between the sprocket halves 100 so that the track is laterally located on the vehicle. The idler wheel 28 and support wheels 30 for the track (FIG. 1) are similarly of two part construction to ensure lateral location of the track upper run. The road wheels 32 laterally locate the track along its lower run as will be described.

Referring back to FIG. 5, the openings 88 in the guiding element 36 are defined in part by cylindrical projections 104 located at respectively opposite sides of the element. It will be appreciated that similar projections exist at the side of element 36 which is hidden in FIG. 5. As each guiding element 36 reaches the drive sprocket 26 when the track is in use, the projections 104 at respectively opposite sides of the leading end of the element are engaged by the teeth 102 of the sprocket and the element is propelled forwardly by rotation of the sprocket. Subsequent teeth engage the projections 104 adjacent the trailing end of the sprocket and to take up the drive. FIG. 7 shows clearly how the teeth engage the projections 104 of the guiding elements 36.

Figure 8:
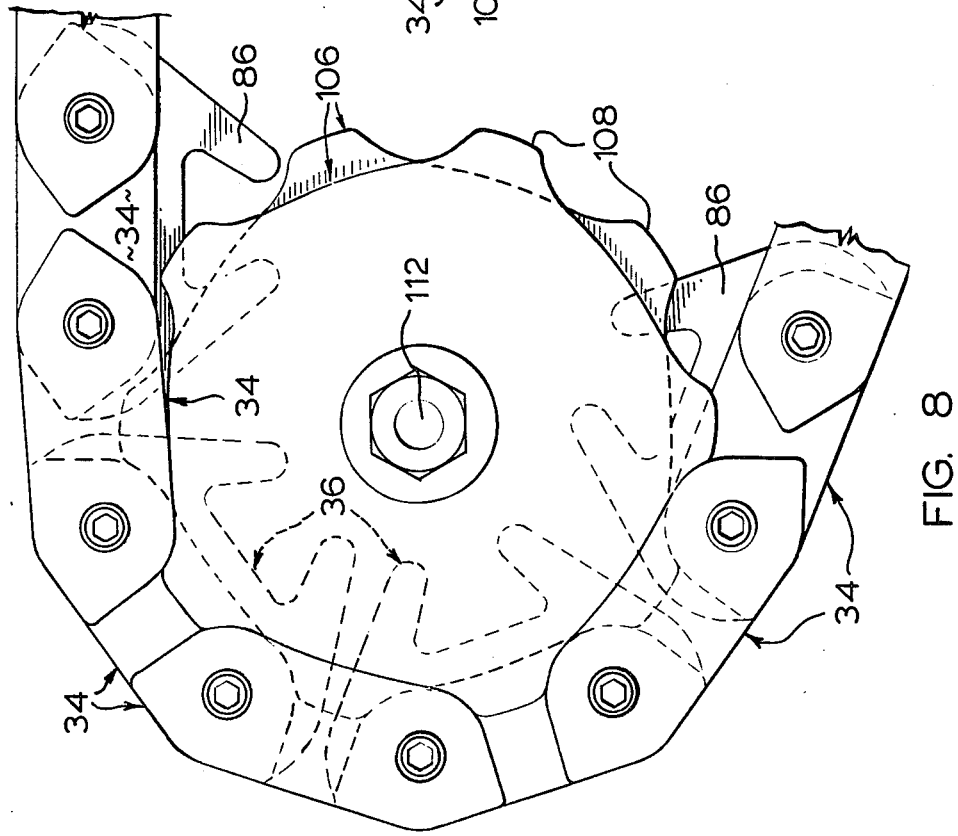
FIG. 8 is a view similar to FIG. 7 showing an alternative drive sprocket arrangement.

As a result of the special profile of the traction elements 34, it is also possible to drive the track by engagement with the traction elements themselves. FIG. 8 illustrates a modified sprocket arrangement for this purpose. This arrangement is more specifically described in and forms the subject of co-pending patent application no. 594,138 of even date herewith entitled "Improvements in drive sprockets for vehicle tracks (now U.S. Pat. No. 4,021,081)".

Referring now to FIG. 8, the alternative drive arrangement employs two sets of sprockets which engage the traction elements on respectively opposite sides of the central row of guiding elements 36. Each set is made up of two angularly offset sprockets 106. Each sprocket has the general shape of a regular pentagon and is provided with protruding "stubby" teeth formations 108 at its corners. The two sprockets are angularly offset by 36° with respect to one another so that the sprocket set together defines ten teeth.

In FIG. 6 parts of the sprockets in the said sets are visible in chain dotted outline. It will be noted that each sprocket 106 is formed with a double flange 110 around its periphery so as to define a relatively broad traction element engaging surface. The sprockets 106 are mounted on a common driven shaft 112 (not visible in FIG. 6 and are arranged so that the two inner sprockets and the two outer sprockets of the respective sets are aligned with one another, whereby a symmetrical driving force is delivered to the track.

As can be seen from FIG. 8, the stubby teeth 108 of the sprockets 106 engage between successive traction elements to drive the track. The portions of the sprockets between the teeth 108 are profiled to define surfaces which are slightly positively curved and which engage the central portions 74 of the upper surfaces 44 of the traction elements. The design of the sprockets and their engagement with the traction elements is more specifically described in U.S. Pat. No. 4,021,081.

Figure 9:
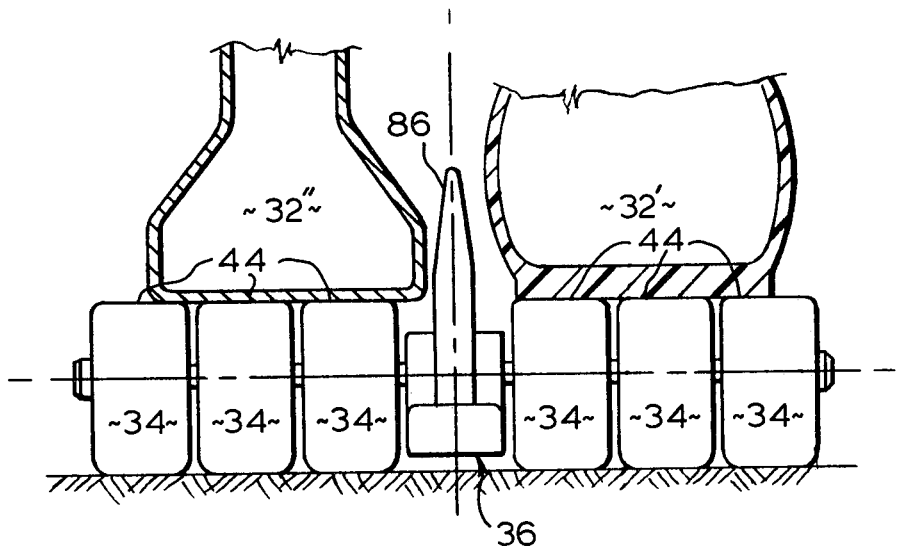
FIG. 9 is a diagrammatic vertical section through the track of FIG. 2 and illustrates two different types of road wheels which may be used in association with the track.

FIG. 9 is a simplified diagrammatic version of FIG. 6 but without the drive sprocket 26. FIG. 9 shows how the road wheels of a vehicle run on the upper road wheel-contacting surfaces 44 of the traction elements. The right hand half of FIG. 9 shows a pneumatic road wheel 32' in contact with the track. The other half of the drawing shows a fabricated metal wheel 32". It will of course be appreciated that FIG. 9 is in effect a composite view showing two alternative road wheels and that in practice both road wheels in each pair would be the same. FIG. 9 also shows how, in the dual road wheel arrangement shown, the track is guided by the lugs 86 of the guiding elements 36. The lugs are located between the two road wheels and locate the track laterally by contact with the inner surfaces of the respective wheels.

Figure 10:
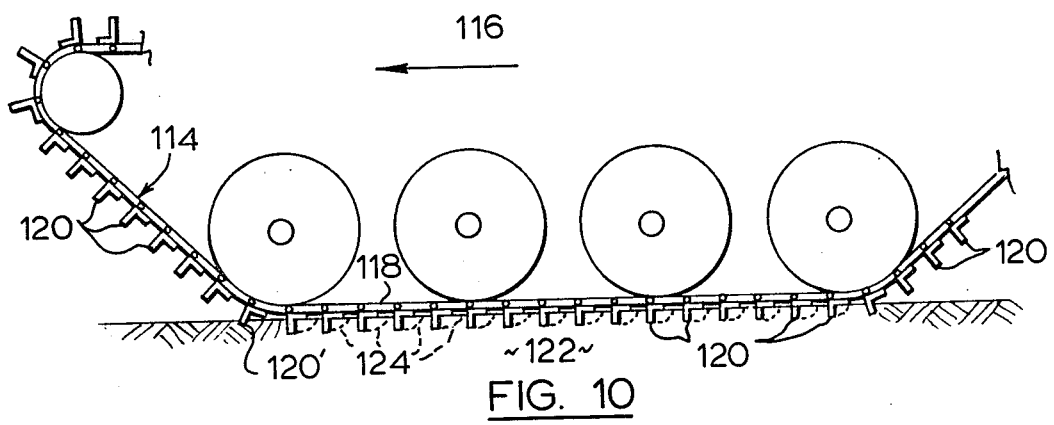
FIGS. 10, 11 and 12 are diagrammatic view illustrating the effect on a ground surface of the track illustrated in the previous figures in contrast with the effect of a conventional track.
Figure 11:
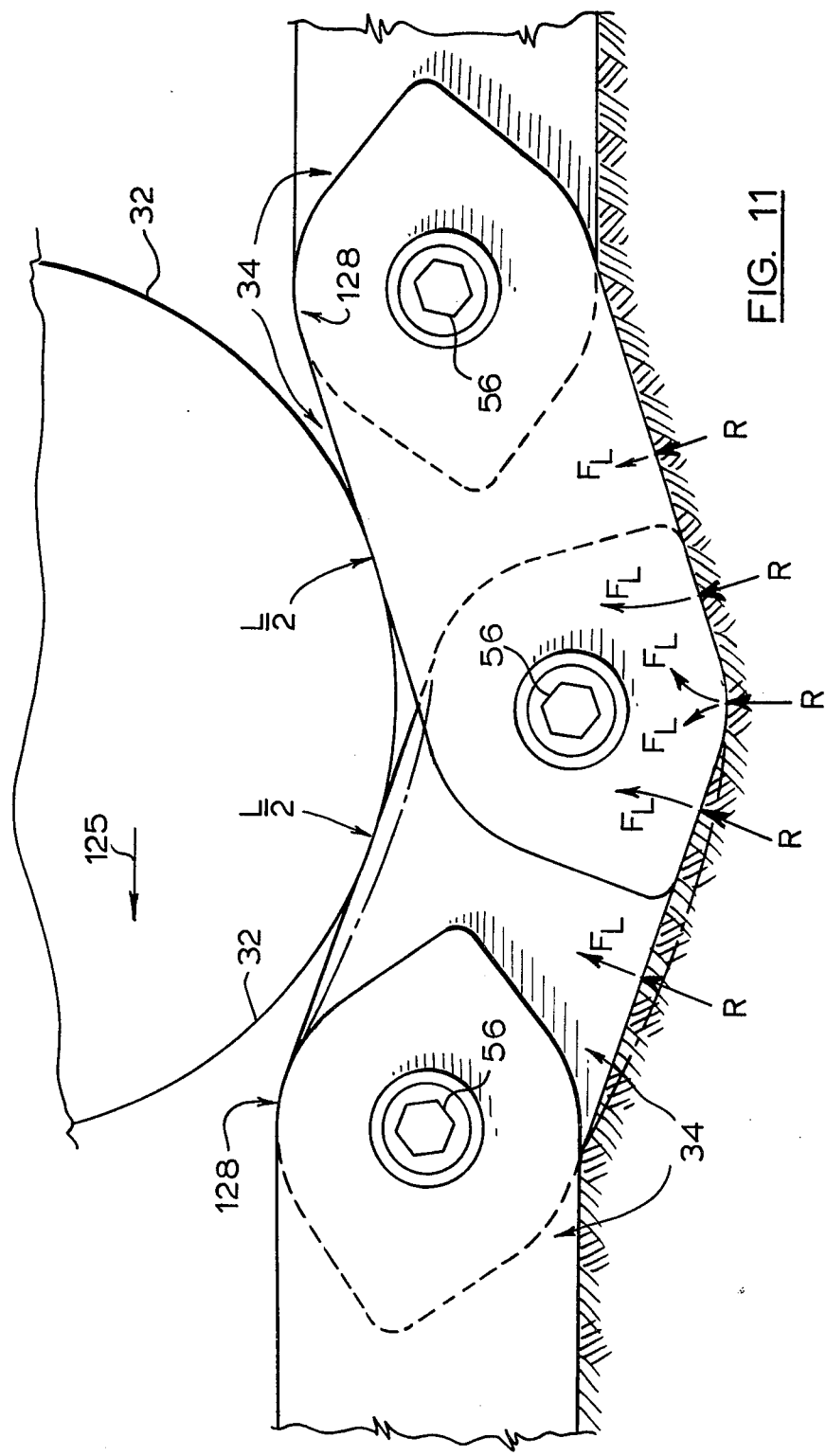

Reference will now be made to FIGS. 10 and 11 in explaining the action of the traction elements on a soil surface as contrasted with the action of a conventional belt type of track fitted with steel grousers. FIG. 10 shows the conventional track. The track is generally indicated at 114 and the direction of motion of the vehicle at 116. The track includes a belt 118 fitted with a plurality of transverse angle-section grousers 120. The soil is indicated at 122 and the dotted lines 124 show the soil shear pattern caused by the grousers as they transgress into the soil. The grouser denoted 120' which is just engaging the soil surface initially causes the soil structure to break down. As this grouser sweeps into the soil, it in effect excavates the section of the soil. Following grousers repeat the action, resulting in severe disturbance of the soil. As a result of the damage to the soil, the productive "drawbar" or traction effect is reduced and driving efficiency is lost.

Figure 12:
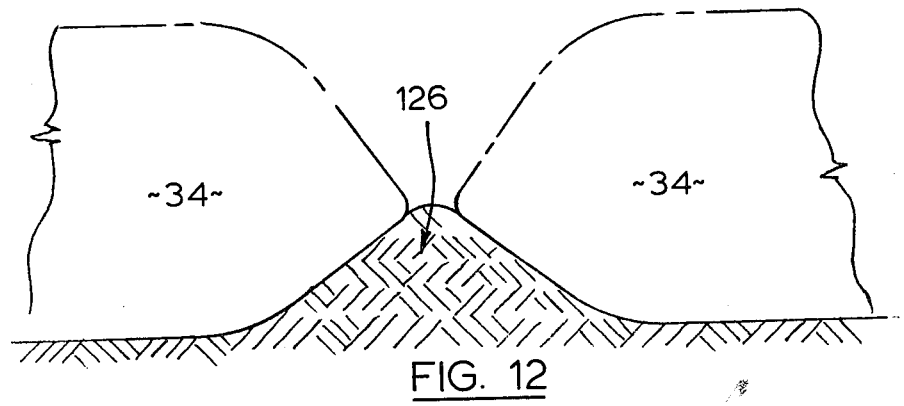

By way of contrast, FIGS. 11 and 12 refer to the track shown in FIG. 2, which includes traction elements according to the invention. FIG. 11 is a side view of part of the track of FIG. 2 and illustrates the compressive forces that are produced in the elastomeric structure of the traction elements due to the effect of a road wheel passing over the elements. The road wheel and traction elements are denoted by the reference numerals used above. The direction of motion of the road wheel track is denoted 125. The meanings of the other designations used in FIG. 11 are as follows:

L — wheel load $F_L$ — elastomeric flow or compressive displacement

R = soil resistance.

FIG. 11 shows the effect of the wheel load on the traction elements at the position of one of the pivot shafts 56 and illustrates the flow which takes place in the elastomeric material of the traction elements due to the resistance of the soil. As the wheel 32 moves forwardly, the progressive load transfer which takes place along a particular elements imparts a "heel and toe" rocking action to that element producing constant oscillation of the element with constant ground to pivot shaft distance. This action is repeated as subsequent road wheels pass over the element. The result of this is a vibratory motion which has a compacting effect on the soil. FIG. 12 shows how this effect moulds the soil into an angular mass 126 between the adjacent end portions of successive traction elements. This mass is termed a positive footprint. The inverted V shaped mount of soil has a high density and a long linear base line, resulting in high shear capacity. Accordingly, the traction efficiency of "drawbar" of the track is high.

Another benefit derived from the "heel and toe" action of the traction elements is that the drawbar remains high when the track is operating in a soft viscous material having a high moisture content. The heel and toe action of the elements produces a "paddle-wheel" effect augmenting the traction efficiency of the track.

FIG. 11 also shows how the radiused portions 80 and 82 of the upper surfaces of adjacent elements in the track co-operate as indicated at 128 to maintain a relatively smooth track upper surface. The chain-dotted outline in FIG. 11 shows how the traction elements will distort under load to follow the ground contour and maintain a smooth track upper surface. It is believed that the track will allow a vehicle to which it is fitted to operate at consistently high speeds on all types of terrain. Further, the "forgiving" nature of the traction elements will allow the track to be used on all types of terrain (including modern highways and fragile soils) with minimal damage to the terrain and without the need to modify or add additional elements to the track.

The traction elements described above are made of the elastomeric material sold under the Trade Mark HYTREL-DUPONT. The bushes 64 and 94 of the coupling assemblies 54 and 90 are also made of this material. Other materials having suitable properties may alternatively be used, e.g. rubber, polyester elastomers, plastics, wood or metal. Preferably, the material has a hardness in the range Shore "A" 40 to Shore "D" 65.

It is also to be understood that many other modifications are possible within the broad scope of the invention. For example, instead of two internal cables each traction element could have one or more than two such cables or other tensile reinforcing members. Also, the specific track driving arrangements described are not essential. Further, it is not essential that the track be modular in the sense that the track elements each occupy a similar area of the track. The track guiding elements could be of different form. It is not essential that these latter elements should engage the ground in addition to guiding the track. In a simple form, each guiding element could simply be a lug projecting upwardly from an assembly of traction elements.

The guiding elements may be made of any suitable metal, plastic or elastomeric material. Each guiding element may have a single upwardly-projecting guiding element.

The coupling assemblies 54 and 90 of the track elements may be of different form. For example, the deformable bushes of the assemblies may be of any suitable elastomeric or plastic material. Further, the inner sleeves (and hence the pivot shafts 56) need not be hexagonal in cross-section; for example, they could be square or octagonal. The bushes may be other than elliptical in shape; for example, the bushes could be circular in cross-section and arranged in eccentric positions. In the case of the coupling assemblies 54 of the traction elements, the outer sleeves 66 will be shaped to correspond with the shape of the bushes. Sleeve 66 is made of steel, although other metals may be used.

Figure 13:
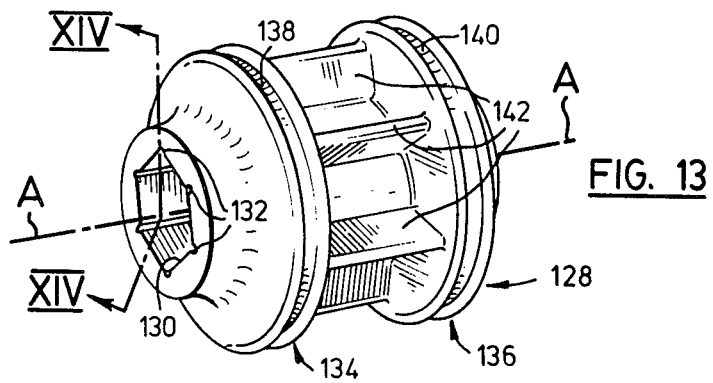
FIG. 13 is a perspective view of a modified coupling means for use in a traction element of the form shown in the previous figures.
Figure 14:
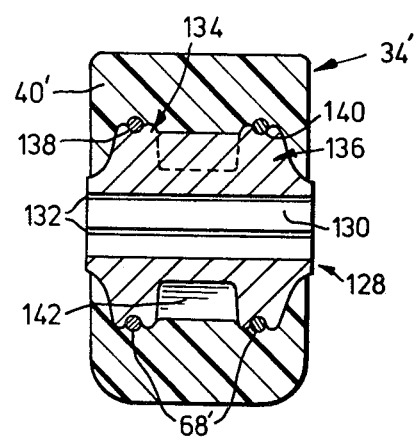
FIG. 14 is a sectional view along line XIV—XIV of FIG. 13, and shows the coupling means in a traction element; and, FIG. 15 is a side view of part of a track made up of traction elements of the form shown in FIG. 14, the track being shown extending around a drive sprocket.
Figure 15:
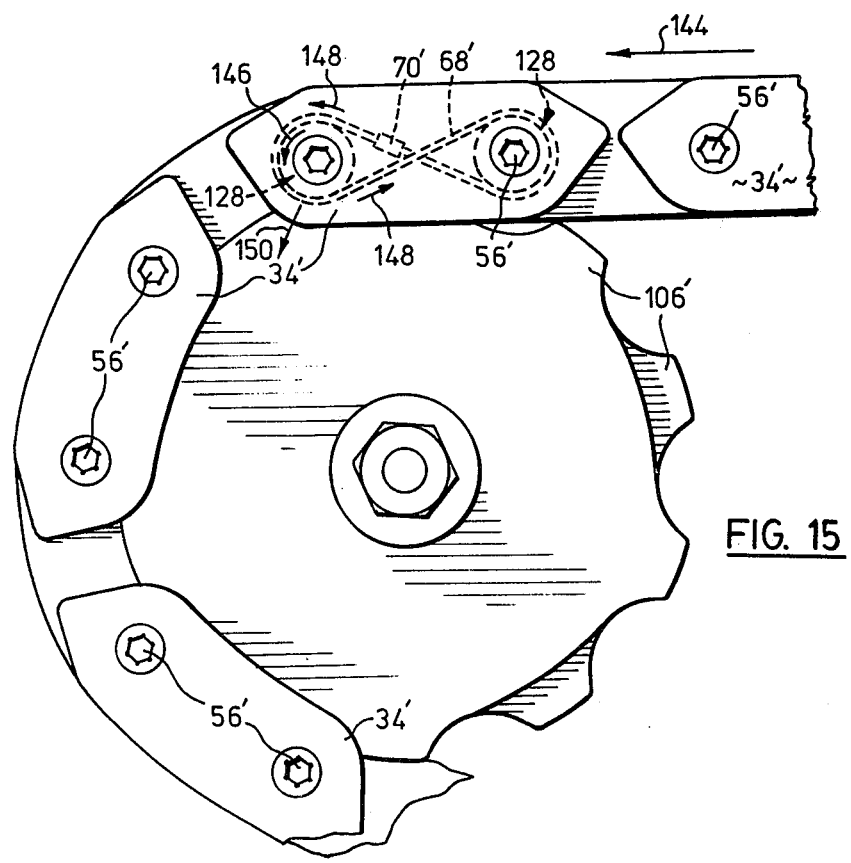

Reference will now be made to FIGS. 13 to 15 in describing an alternative form of coupling means which may be used in place of the coupling assemblies 54 in the traction elements 34 of the track. The coupling means shown in FIGS. 13 to 15 may be considered as a specially-shaped torsion sleeve and is generally designated by reference numeral 128. The remaining parts of the track shown in FIGS. 14 and 15 are similar to the corresponding parts shown in the previous views and are designated by primed reference numerals.

Referring first to FIG. 13, the torsion sleeve 128 is a one-piece steel element shell cast from SAE 4130 steel, machined and stress relieved, and heat-treated to Rockwell C-47 hardness. The material is not, however, believed to be critical. Moreover, the torsion sleeve could be made in several parts if necessary. In any event, referring back to the drawing, the torsion sleeve defines a longitudinal axis A—A and a hexagonal bore 130 extending about said axis. Bore 130 is shaped to receive one of the hexagonal track-element coupling shafts 56 described in connection with the preceding figures. To facilitate insertion of one of these shafts into the torsion sleeve, longitudinal recesses 132 are provided at the corners of the hexagon defined by the bore 130.

Sleeve 128 includes, adjacent its respective ends, two circular formations 134 and 136 disposed in spaced parallel planes generally normal to the longitudinal axis A—A of the sleeve. Each of the formations 134 and 136 has a peripheral edge formed with a continuous semi-circular groove disposed concentrically about axis A. The grooves of the respective formations are indicated at 138 and 140 in FIG. 13.

Extending between the formations 134 and 136 are a plurality of vanes 142 disposed radially with respect to axis A—A. In this embodiment, six vanes 142 are provided and are spaced equiangularly about axis A—A in positions generally corresponding to the longitudinal recesses 132 of bore 130.

FIG. 14 shows the torsion sleeve 128 of FIG. 13 in a traction element 34'. As in the preceding embodiment, the traction element includes a body 40' of an elastomeric material. Sleeve 128 is molded into the elastomeric body 40'. During the molding process, the elastomeric material flows into the spaces between the vanes 142 of the torsion sleeve so that the sleeve and body are in effect mechanically locked together. Two tensile reinforcing cables 68' are visible in FIG. 14 and are disposed in the grooves 138 and 140 of the respective circular formations 134 and 136 of the torsion sleeve. One of the cables 68' is also visible in FIG. 15 and it will be noted that the element is disposed in a crossed configuration as in the preceding embodiment with its outer ends joined by a sleeve 70'. The grooves ensure that the cables remain in their spaced parallel positions during the molding operation and are not displaced by the molding pressure of the elastomeric material.

FIG. 15 is a view similar to FIG. 8 showing part of a track in engagement with a pair of angularly offset polygonal sprockets of the form described in more detail in connection with FIG. 8. The two sprockets are indicated at 106' in FIG. 15 and the traction element of the track are indicated at 34' while the guiding elements are denoted 36'. The track shown in FIG. 15 is similar to the track shown in FIG. 8 except that the traction elements incorporate torsion sleeves 128 rather than the elastomeric coupling assemblies 54 of the previous views. The direction of track movement is indicated by arrow 144 in FIG. 15. Each traction element has a first torsion sleeve 128 adjacent its leading end and a second, similar torsion sleeve adjacent its trailing end. As a traction element moves into engagement with and around the two sprockets 106', the hexagonal shaft 56' coupled to the leading torsion sleeve will begin to turn in a direction indicated by arrow 146 in FIG. 15. Because the sleeve is mechanically keyed to the elastomeric body of the traction element as described above, this turning of the sleeve causes a corresponding torsional distortion of the elastomeric body 40' in the vicinity of the torsion sleeve. Also, the internal cables of the element are correspondingly stressed as indicated by the arrows 148. Since these cables are molded into the elastomeric body, corresponding local deformation of the elastomeric body occurs in the vicinity of the cables. The cumulative effect of these forces is that a torsional moment couple is produced in the elastomeric body of the traction element as indicated by the arrows 150, causing the element to bend generally in conformity with the curvature of the sprockets 106'.

It is believed that, compared with the coupling assemblies 54 described previously, the torsion sleeves 128 will provide increased torsional displacement of the elastomeric bodies 40' at lower stress levels, resulting in a reduction in the hystereses losses in the bodies. Also, the security of the mechanical engagement between the torsion sleeves and the elastomeric bodies of the traction elements is improved. In addition to mechanical locking, the area of contact between each sleeve and the surrounding elastomeric body is increased compared with the coupling assemblies 54, which makes for improved bonding.

While the torsion sleeves 128 have been described exclusively in conjunction with the traction elements, it is to be understood that similar sleeves could be used in the guiding elements 36 of the track if these elements were made of an elastomeric material.

It is of course to be understood that the arrangement of the track elements may vary from the particular configuration illustrated in FIG. 2. Examples of other track configurations appear in co-pending patent application no. 594,139 of even date herewith entitled "Improvements in vehicle tracks". Further, the traction element of the present invention may also find application in conventional modular or segmented track arrangements.

Finally, it is to be understood that FIG. 1 of the drawings is merely a schematic illustration of one type of vehicle which may be fitted with a track including traction elements according to the invention. As has been explained, the vehicle of FIG. 1 is fitted with two tracks located at respectively opposite sides of the vehicle. In an alternative type of vehicle, additional tracks may be provided. Some or all of these tracks may be mounted on steerable subassemblies pivotally coupled to the body of the vehicle in question.

The drive sprocket (26) could be located adjacent the front of the vehicle and the idler wheel (28) adjacent the rear of the vehicle. Of course, the number of road wheels (32) and the number of track supporting idlers (30) may also vary. In fact the idlers may be omitted in some arrangements.

What I claim is:

1. A traction element for use in an endless track for a tracked vehicle, the element comprising:
    a resilient body having a lower ground-contacting surface, and an upper road wheel-contacting surface, said surfaces being generally flat in transverse cross-section and including respective end portions which are inclined towards one another to define tapered ends of said body;
    means adjacent each end of said body for coupling the element with other elements in a track, said means defining parallel axes extending transversely of said body, about which the element can move angularly in use, each of said coupling means comprising a non-resilient sleeve embedded in and mechanically coupled to said resilient body, said sleeve defining: a plurality of outwardly projecting vanes disposed generally radially with respect to said axis and mechanically coupling the sleeve to said resilient body; and a bore which extends about the relevant one of said parallel axes and which is shaped to receive in non-rotatable fashion a shaft for coupling the traction element with an adjacent element in the track, whereby turning of said shaft with respect to the element in use causes the sleeve to turn and torsionally stress the resilient body of the traction element; and,
    tensile reinforcing means extending between said coupling means inside said resilient body and comprising two flexible cables disposed in positions spaced transversely with respect to said parallel axes of the element, each cable being arranged to define an endless loop which extends around said non-resilient coupling sleeves, and wherein each of said non-resilient coupling sleeves of the element includes two circular formations disposed in generally parallel planes spaced longitudinally of said axis of the elements, each formation defining a peripheral groove receiving one of said flexible cables, and wherein said outwardly projecting vanes of the sleeve extend between said disc-like formations;
    said upper and lower surfaces of the resilient body including respective central portions extending parallel to one another, and said lower surface includng radiused surface portions located at each end of said central portion such that said end portions merge smoothly into the central portion, each said radiused portion defining, in cross-section, an arc centered on the adjacent one of said axes, whereby the traction element can pivot on the relevant one of said radiused surface portions when the element moves angularly about the associated axis in use.

2. A traction element as claimed in claim 1 wherein each said end portion of said lower ground-contacting surface is disposed at an angle of approximately 36° with respect to a plane containing said lower ground-contacting surface.

3. A traction element as claimed in claim 1, wherein said upper road wheel-contacting surface also includes radiused surface portions located at each end of said central portion such that said end portions merge smoothly into the central portion, each said radiused portion defining, in cross-section, an arc centered on the adjacent one of said axes.

4. A traction element as claimed in claim 1, wherein each of said arcs subtends an angle of approximately 40°.

5. A traction element as claimed in claim 1, wherein said bore in the non-resilient sleeve of the element coupling means is of generally hexagonal shape in cross-section and is intended to receive a hexagonal shaft.

* * * * *